(No Model.)
D. HARTLEY.
WEATHER STRIP.
No. 417,178. Patented Dec. 10, 1889.
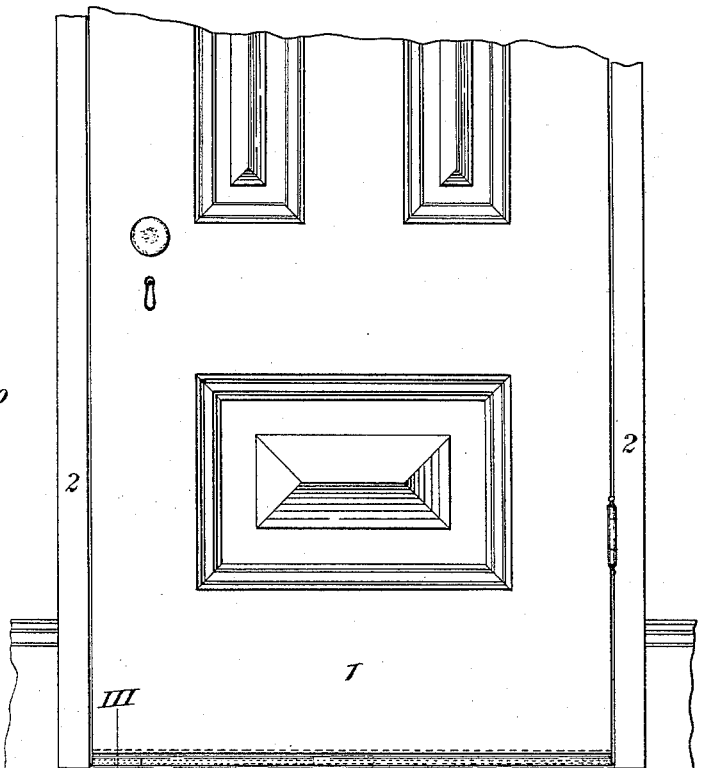
Fig. I.
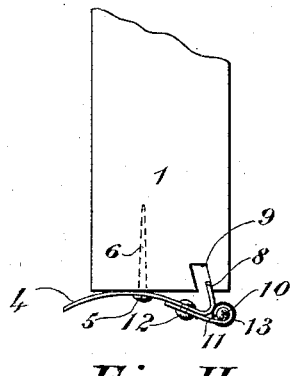
Fig. II.
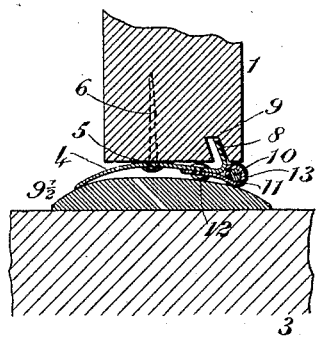
Fig. III.
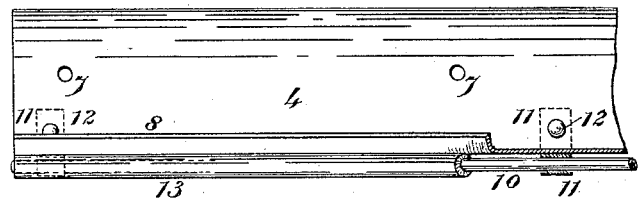
Fig. IV.
Witnesses
E. Arthur
M. J. Larcombe
INVENTOR.
Daniel Hartley.
by Knight Bros.
Attorneys
N. PETERS, Photo-Lithographer, Washington, D. C.

UNITED STATES PATENT OFFICE.

DANIEL HARTLEY, OF OLATHE, KANSAS.

WEATHER-STRIP.

SPECIFICATION forming part of Letters Patent No. 417,178, dated December 10, 1889.

Application filed June 13, 1889. Serial No. 314,082. (No model.)

*To all whom it may concern:*

Be it known that I, DANIEL HARTLEY, of Olathe, in the county of Johnson and State of Kansas, have invented certain new and useful Improvements in Weather-Strips, of which the following is a full, clear, and exact description, reference being had to the accompanying drawings, forming a part of this specification, and in which—

Figure I is a front view of a portion of a door, showing my improvement attached. Fig. II is an end view showing the position of the strips when the door is open. Fig. III is a section taken on line III III of Fig. I. Fig. IV is a detail top view of the strip, showing portions broken away.

My invention relates to an improved weather-strip for doors, &c.; and my invention consists of features of novelty hereinafter described, and pointed out in the claims.

Referring to the drawings, 1 represents a door, 2 the door-frame, and 3 the door-sill.

4 represents a curved plate pivoted at 5 to the under side of the door. This plate may be attached by nails 6, passing through holes 7 in the plate, or it may be otherwise attached, as may be desired. The rear end of the plate is turned upward, as shown at 8, the upturned end engaging in a slot 9 in the door. The front end of the plate is curved to fit close against the carpet-strip or threshold 9½ when the door is in a closed position, thus preventing water or air from passing under the plate. (See Fig. III.) To the rear of the plate I secure a rod 10 by means of straps 11, the outer ends of the straps passing around the rod, and the inner ends are secured to the plate by means of rivets 12. On the rod 10, I place a rubber tubing 13, and these parts constitute an enlargement. When the door is open, as the rear or enlarged end of the plate is heavier than the forward end, the plate will take the position shown in Fig. II, the rear end being at its lowest limit and the forward end at its highest limit. Then, as the door is being closed the forward end of the plate will ride up over the curved threshold until the rubber tubing comes in contact with the threshold, when the rear end will be forced upward, forcing the upturned end 8 upward in the slot 9. It will be seen that as the rear end of the plate is forced upward the forward end will be forced downward, thus making a tight connection between the door and the threshold. As the upturned end 8 extends into the slot 9, it will be seen that this would prevent any air or water from passing over the plate into the room.

I do not confine myself to a rubber tubing, as shown, as a rubber strip may be used, or the rubber may be omitted entirely, if so desired, as the contact of the rod or of the plate itself with the threshold would force the plate into the desired position to exclude the air and water.

I claim as my invention—

1. A weather-strip consisting of a curved plate pivoted to the under side of a door, said strip forming a tight connection between the door and threshold by the pressure of the threshold against the rear of the strip, substantially as described, and for the purpose set forth.

2. In a weather-strip, the combination of a door, a threshold, a curved plate pivoted directly under and to the door on its lower side, and an enlargement at the rear of the plate, which end is heavier than the forward end, whereby when it comes in contact with the threshold the rear end is forced upward and the forward end is forced downward, substantially as described, and for the purpose set forth.

3. In a weather-strip, the combination of a door, a threshold, curved plate pivoted to the door, and a rod secured rigidly to the rear of the plate in order to strengthen the same, substantially as described, and for the purpose set forth.

4. In a weather-strip, the combination of a door, a threshold, curved plate pivoted to the door, a rod secured to the rear of the plate, and rubber tubing on said rod, substantially as described, and for the purpose set forth.

5. In a weather-strip, the combination of a door, a threshold, curved plate pivoted to the door, and a rubber tubing secured to the rear of the plate, substantially as described, and for the purpose set forth.

6. In a weather-strip, the combination of a door, slot 9 in the door, a threshold, curved plate pivoted to the door, said plate having an upturned end 8, engaging in the slot 9, and an enlargement on the rear of the strip, whereby when it comes in contact with the threshold the upturned end 8 is forced into the slot 9, substantially as described, and for the purpose set forth.

DANIEL HARTLEY.

In presence of—
 JAS. E. KNIGHT,
 ALFRED BRUMWELL.